UNITED STATES PATENT OFFICE.

ALBRECHT SCHMIDT AND GUSTAV KRÖNLEIN, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

SULFUR DYESTUFFS AND PROCESS OF MAKING SAME.

1,128,371.    Specification of Letters Patent.    Patented Feb. 16, 1915.

No Drawing.    Application filed April 24, 1913.    Serial No. 763,432.

*To all whom it may concern:*

Be it known that we, ALBRECHT SCHMIDT, Ph. D., chemist, and GUSTAV KRÖNLEIN, Ph. D., chemist, citizens of the Empire of Germany, residing at Höchst-on-the-Main, Germany, have invented certain new and useful Improvements in Sulfur Dyestuffs and Processes of Making Same, of which the following is a specification.

In U. S. patent-application Ser. No. 763,431 filed April 24, 1913, are described new indophenolsulfonic acids of the general formula:-

$$C_{12}H_6(NX)(SO_3R).N=Ar=O$$

wherein X stands for the series: H, methyl, ethyl, etc.; R for a cation (H, K, Na, (NH$_4$), etc.); and Ar for an arylene residue and their leuco-compounds, said new acids being obtainable from carbazol- or alkylcarbazol-monosulfonic acids, by the action of nitrosophenols or p-aminophenols. Now we have found that by heating said new indophenolsulfonic acids with alkali-polysulfids, dyestuffs are obtained which are readily soluble in alkali-sulfids and readily give dyeings of remarkable fastness to the action of chlorin. This is an unexpected result, because, as is known, no proper sulfur-dyestuffs are obtained by heating the indophenols of the carbazol series, particularly the alkylcarbazol series, but, instead, vat-dyestuffs, which only dye from the hydrosulfite vat, and give in sodium-sulfid solution only weak dyeings or no dyeings at all.

The following example illustrates our invention: 10 kilos of indophenolsulfonic acid, or the corresponding quantity of the paste, obtained according to said application, by condensing, for instance, nitrosophenol with carbazol- or N-methyl- or ethyl-carbazol-monosulfonic acid, are introduced into a solution of 30 kilos of crystallized sodium sulfid, 16.5 kilos of sulfur and 15 kilos of water, and the mass is heated on the reflux-apparatus to boiling for 48 hours, while stirring. The solution produced may be directly used for dyeing, or air may first be blown into the dyestuff and then the latter salted out. The dyestuff thus obtained dyes cotton, from a bath containing alkali-sulfid, dark blue tints. When the indophenol sulfonic acid employed is made from p-nitrosophenol and carbazol-monosulfonic acid, it has the formula $$C_{12}H_6(NH)(SO_3H).N=C_6H_4=O.$$

In the process of sulfurizing the dyestuff, the usual variations can be practised; for instance the proportion of the polysulfid, the concentration of the sulfurizing mass, and also the solvent, may be varied. Furthermore, in the place of the indophenolsulfonic acids there may be used in an analogous manner their leuco-compounds.

Having now described our invention, what we claim is:

1. The process of manufacturing sulfur-dyestuffs, fast to chlorin and readily soluble, which consists in treating an indophenol-sulfonic acid of the general formula:

$$C_{12}H_6(NX)(SO_3R).N=Ar=O$$

wherein X stands for the series: H, methyl, ethyl, alkyl; R for a cation; and Ar for an arylene residue, with sulfur and alkali sulfids.

2. The process of manufacturing a sulfur dyestuff, fast to chlorin and readily soluble, which consists in treating with sulfur and an alkali sulfid the indophenolsulfonic acid $$C_{12}H_6(NH)(SO_3H).N=C_6H_4=O$$

produced from p-nitrosophenol and carbazol-monosulfonic acid.

3. As new products, the blue sulfur dyestuffs, obtained by treating an indophenolsulfonic acid of the general formula:

$$C_{12}H_6(NX)(SO_3R).N=Ar=O$$

wherein X stands for the series: H, methyl, ethyl, alkyl; R for a cation; and Ar for an arylene residue, with sulfur and alkali sulfids, said dyestuffs being fast to the action of chlorin and light, readily soluble in water, soluble with a blue color in concentrated sulfuric acid, insoluble in organic solvents, capable of being precipitated by the addition of common salt and acids, or by blowing air into the fusion, and being suitable for dyeing with use of apparatus.

4. As a new product, the blue sulfur-dyestuff, obtainable by treating with sulfur and an alkali-sulfid the indophenolsulfonic acid:

$$C_{12}H_6(NH)(SO_3H).N=C_6H_4=O$$

produced from p-nitrosophenol and carbazol-monosulfonic acid, said dyestuffs being fast to the action of chlorin and light, readily soluble in water, soluble with a blue color in concentrated sulfuric acid, insoluble in organic solvents, capable of being precipitated by the addition of common salt and acids, or by blowing air into the fusion, and being suitable for dyeing with use of apparatus.

In testimony whereof, we affix our signatures in presence of two witnesses.

ALBRECHT SCHMIDT.
GUSTAV KRÖNLEIN.

Witnesses:
JEAN GRUND,
CARL GRUND.